United States Patent [19]

Chen et al.

[11] Patent Number: 4,886,617
[45] Date of Patent: Dec. 12, 1989

[54] WATER SOLUBLE PHOSPHONATED POLYMERS

[75] Inventors: Fu Chen, Newtown; Keith Bair, Hatboro, both of Pa.

[73] Assignee: Betz Laboratories, Inc., Trevose, Pa.

[21] Appl. No.: 354,547

[22] Filed: May 19, 1989

Related U.S. Application Data

[63] Continuation of Ser. No. 313,692, Feb. 21, 1989, Pat. No. 4,851,490, which is a continuation-in-part of Ser. No. 191,309, May 6, 1988, Pat. No. 4,849,129, which is a continuation-in-part of Ser. No. 37,484, Apr. 13, 1987, Pat. No. 4,759,851, which is a continuation of Ser. No. 864,049, May 16, 1986, Pat. No. 4,659,481, which is a continuation of Ser. No. 545,563, Oct. 26, 1988, abandoned.

[51] Int. Cl.$^4$ .......................... C02F 5/10; C23F 11/16
[52] U.S. Cl. .............................. 252/180; 252/389.22; 252/392; 252/DIG. 11; 422/15
[58] Field of Search .................. 252/180, 389.22, 392, 252/DIG. 11; 422/15

[56] References Cited

U.S. PATENT DOCUMENTS

| | | |
|---|---|---|
| 2,723,971 | 11/1955 | Cupery . |
| 3,262,903 | 7/1966 | Robertson . |
| 3,799,893 | 3/1974 | Quinlan . |
| 4,046,707 | 9/1977 | Smith et al. . |
| 4,207,405 | 6/1980 | Masler et al. . |
| 4,500,693 | 2/1985 | Takehara . |
| 4,650,591 | 3/1987 | Boothe et al. . |
| 4,659,480 | 4/1987 | Chen et al. . |
| 4,678,840 | 7/1987 | Fong et al. . |
| 4,708,815 | 11/1987 | Chen et al. . |
| 4,782,120 | 11/1988 | Rousset et al. . |

FOREIGN PATENT DOCUMENTS 56-155692 12/1981 Japan .
59-135202 8/1984 Japan .

*Primary Examiner*—Joseph L. Schofer
*Assistant Examiner*—N. Sarofim
*Attorney, Agent, or Firm*—Alexander D. Ricci; Gregory M. Hill

[57] ABSTRACT

Novel water soluble polymers containing an hydroxyl alkyl aminoalkylene phosphonate functionality are disclosed. These polymers have utility as deposit control agents effective in a number of water systems such as cooling, boilers conversion coating, paper and pulp processing and gas scrubbing.

The polymers are formed from the polymerization of ethylenically unsaturated compounds with a compound having the structure:

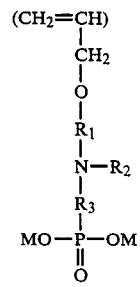

in which $R_1$ is an hydroxyl substituted or nonsubstituted lower alkylene group, $R_2$ is H or lower alyl group, $R_3$ is a lower alkylene group and M is H or water soluble cation.

14 Claims, No Drawings

WATER SOLUBLE PHOSPHONATED POLYMERS

This is a continuation of Ser. No. 313,692 filed Feb. 21, 1989, now U.S. Pat. No. 4,851,490, which is a continuation-in-part of Ser. No. 191,309 filed May 6, 1988, now U.S. Pat. No. 4,849,129, which is a continuation-in-part of Ser. No. 037,484, filed Apr. 13, 1987, now U.S. Pat. No. 4,759,851, which is a continuation of Ser. No. 864,049 filed May 16,1986, now U.S. Pat. No. 4,659,481, which is a continuation of Ser. No. 545,563, Oct. 26, 1983, now abandoned.

FIELD OF THE INVENTION

The present invention pertains to a composition of novel water soluble polymers containing an hydroxyl alkyl aminoalkylene phosphonate functionality. The polymers may be used as deposit control agents to control the formation and deposition of scale imparting compounds in water systems such as cooling, boiler, conversion coating, paper and pulp processing, and gas scrubbing systems.

The problem of scale formation and attendant effects have troubled water systems for years. For instance, scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Typically, in cooling water systems, the formation of calcium sulfate, calcium phosphate or calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, Pa. Pages 85–96, the formation of scale and sludge deposits on boiler heating surfaces is a serious problem encountered in steam generation.

Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their resultant deposition. The carbonates of magnesium and calcium are not the only problem compounds as regards scale, but also water having high contents of phosphate, sulfate and silicate ions either occurring naturally or added for other purposes cause problems since calcium and magnesium, and any iron or copper present, react with each and deposit as boiler scale. As is obvious, deposition on the structural parts of a steam generating system causes poorer circulation and lower heat transfer capacity, resulting in an overall loss in efficiency.

Chromate-based products, in combination with polymeric dispersants and polyphosphates, have been reasonably effective against both corrosion and scaling. However, due to the instability of polyphosphates and environmental concerns of chromate; organophosphorus phosphorus compounds such as the Dequest series of products (from Monsanto) combined with zinc or molybdate compounds are used as alternatives to chromate-polyphosphate systems. In addition, polymeric dispersants such as polyacrylic acid, polymethacrylic acid, acrylic acid/hydroxy-alkyl acrylate copolymers, styrene sulfonic acid/maleic anhydride, and acrylic acid/ 2-acrylamido-2-methylpropanesulfonic acid (AMPS), etc., are still required for an effective treatment. Also, the extreme pH variation of these organophosphorus compounds sometimes make a one drum treatment program difficult.

Accordingly, the development of a new water soluble polymer combining the desired organophosphorus and carboxylic or sulfonic functionalities into the polymer will contribute to the advancement of the art of water soluble polymers and to the technology of water treatment.

PRIOR ART

U.S. Pat. No. 4,500,693 (Takehara et al.) discloses sundry copolymers composed of a (meth)acrylic acid monomer and an allylic ether monomer. According to the '693 disclosure, the reaction product of allylic ether monomer may include, inter alia, the reaction product of allyloxy dihydroxypropane with various reagents, such as, ethylene oxide, phosphorus pentoxide, propylene oxide, monoaryl sorbitan, etc. When phosphorus pentoxide is reacted with allyloxydihydroxy-propane, the resulting product is reported to contain phosphate functionality in contrast to the phosphonate functionality bonded to the polymer matrix in accordance with the present invention.

U.S. Pat. Nos. 4,659,480 and 4,708,815 (both to Chen et al., continuations-in-part ultimately from Ser. No. 06/545,563, now abandoned) disclose the reaction of allyl glycidyl ether with phosphorus acid ($H_3PO_3$) which results in allyloxy hydroxypropyl phosphite with a distinct CO-P-H structure. Water soluble copolymer and terpolymer compositions are then prepared using the phosphite containing monomer. These disclosures are in contrast to the phosphonate functionality bonded to the polymer matrix in accordance with the present invention, where the linkage is $C-PO_3H_2$ and contains no P-H bond.

U.S. Pat. No. 3,799,893 (Quinlan) discloses methylene phosphonates of glycidyl reacted polyalkylene polyamines. The amines employed therein are polyalkylenepolyamines, for example, of the formula:

$$NH_2\text{-}[A\text{-}N]_n^H H$$

where n is an integer, preferably 2-5, A is an alkylene group $-(CH_2)_m-$, where m is 2-10 or more, but preferably ethylene or propylene. The resulting product is a hard resin like solid that foamed in water.

Of further interest to the present invention is U.S. Pat. No. 4,046,707 (Smith, et. al.) wherein water treatment usage of certain phosphorous acid/acrylic acid telomeric reaction products is taught. The disclosed telomeric compound contains only one phosphonate group at the terminal position. U.S. Pat. No. 4,207,405 (Masler, et. al.) also teaches certain reactions of poly (meth) acrylic acid with phosphorous acid or precursor thereof to yield a hydroxydiphosphonic acid adduct with the polymer. The reaction must be carried out under anhydrous conditions, with the product then being hydrolyzed in an aqueous medium. The precise structure of the reaction product is difficult to identify and contains only low levels of phosphorus substitution.

Of lesser interest are U.S. Pat. Nos. 3,262,903 (Robertson) and 2,723,971 (Cupery) which teach reacting a polyepoxide with orthophosphonic acid to provide a polymer having a phosphoric acid ester substituent. The resulting polymeric phosphate is soluble in organic solvents and is useful as a film forming ingredient in coating compositions. It cannot be used in the water treatment field wherein water solubility is an essential criterion.

Other prior art patents which may be of interest include: Japanese Pat. Nos. 56-155692 and 59-135202, U.S. Pat. 4,782,120 (Rousset et al.), U.S. Pat. No. 4,678,840 (Fong et al) and U.S. Pat. No. 4,650,591 (Boothe et al). In the '840 and '591 patents, phosphonate groups bonded to a vinyl amide moiety is disclosed. They differ structurally from the present invention in that a hydroxylated alkylene allyl ether is connected to the amino alkylene phosphonate group.

DETAILED DESCRIPTION OF THE INVENTION

We have prepared novel water soluble polymers having the structure:

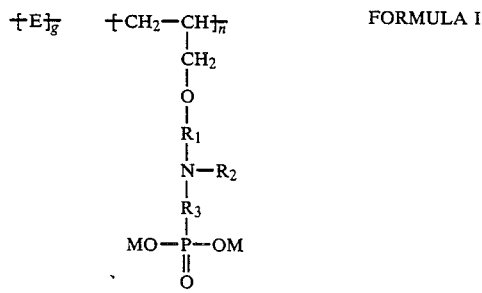

FORMULA I wherein E in the above formula (Formula I) is the repeat unit obtained after polymerization of ethylenically unsaturated compounds, preferably carboxylic acid, amide form thereof, lower alkyl (C1-C1-C6) ester or hydroxylated lower alkyl (C1-C6) ester of such carboxylic acid. Compounds encompassed by E include the repeat unit obtained after polymerization of acrylic acid, methacrylic acid, acrylamide, maleic acid or anhydride, styrene sulfonic acid, 2-acrylamido-2methylpropylsulfonic acid, itaconic acid and 2-hyroxypropyl acrylate; and the like. Water soluble salt forms of the acids are also within the purview of the invention.

$R_1$ in the above formula (Formula I) is a hydroxyl substituted lower alkylene group having from about 1-6 carbon atoms or a nonsubstituted lower alkylene group having from about 1-6 carbon atoms; $R_2$ is hydrogen or a lower alkyl group having from about 1-5 carbon atoms; $R_3$ is a lower alkylene group having from about 1-6 carbon atoms; M is hydrogen or a water soluble cation.

The molar ratio of the monomers (g:h) of Formula I may fall within the range of 30:1 to 1:20, with a molar ratio of about 10:1 to 1:5 being preferred.

It should be mentioned that water soluble terpolymers comprising monomers g and h of Formula I may also be used in this invention. It is also to be understood that minor amounts of additional monomers may be added to the polymers.

The number average molecular weight of the water soluble copolymer of Formula I is not critical and may fall within the range of 1,000 to 1,000,000. Preferably the number average molecular weight will be within the range of from about 1,500 to 500,000, with the range of about 1,500 to about 15,000 being even more highly desirable. The key criterion is that the polymer be water soluble.

The monomer h in Formula I is prepared in a two step synthesis. First the desired amine is reacted with allyl glycidyl ether AGE) to give a product in accordance with the equation;

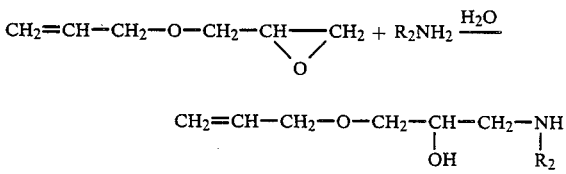

$$CH_2=CH-CH_2-O-CH_2-\underset{OH}{CH}-\underset{R_2}{CH_2-NH}$$

where $R_2$ is hydrogen or lower alkyl of from 1-5 carbons, such that the monomer is water soluble.

The reaction may be carried out in an aqueous medium with a reaction temperature ranging from 0° to 25° C. For each mole of AGE used, an excess of 2.0-10.0 moles of the amine is used to prevent disubstitution on the nitrogen atom. Allyl glycidyl ether may be added over a period of from half an hour to four hours with the longer time preferred. The product is then isolated by fractional distillation.

Step two requires the addition of phosphorous acid and hydrochloric acid to the amine followed by addition of aqueous formaldehyde at reflux temperatures to form a Mannich type product, according to the equation:

$$CH_2=CH-CH_2-O-CH_2-\underset{OH}{CH}-\underset{R_2}{CH_2-NH} +$$

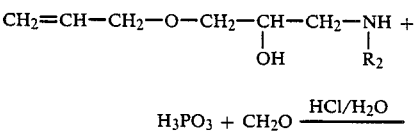

-continued

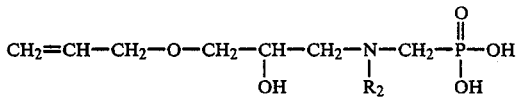

where $R_2$ is hydrogen or lower alkyl group of from 1–5 carbons.

For each molar equivalent of the amine used, 0.85–2.0 moles of phosphorous acid and formaldehyde are used with a 1:1:1 ratio preferred. An equivalent amount of hydrochloric acid is used to prevent oxidation of the phosphorous acid. The aqueous formaldehyde is added last with an addition time of from half an hour to four and one half hours with the longer time preferred.

The structure of the preferred N-methyl, 3-(2-propenyloxy)-2-hydroxypropyl aminomethylene phosphonic acid (MPHPAP) was substantiated by $^{13}$C NMR and $^{31}$P NMR spectroscopy. The $^{13}$C NMR signal of the methylene carbon adjacent to the phosphorus atom is split by the phosphorus to form a doublet around 52.5 and 54.5 ppm with a $J_{P\text{-}C}$ of 135.8 Hz. Table I gives the signals for all the carbon species found in the molecule. $^{31}$P NMR spectra were obtained in water and give signals in the range of 7–15 ppm downfield from external phosphoric acid. The signal splits into a triplet due to coupling with the two protons on the neighboring methylene group. The chemical shifts of the phosphonic acid are dependant on the pH of the solution. Partial neutralization gives two signals in this range, one for the phosphonic acid and one for the monosodium salt of the acid.

After the desired monomers are produced and isolated, free radical polymerization may proceed in solution, suspension, bulk, emulsion or thermal polymerization form. The polymerization may be initiated by conventional persulfate or peroxide initiators or by an azo compound. Commonly used chain transfer agents such as lower alkyl alcohols, amines or mercapto compounds may be used to regulate the molecular weight. An accelerator such as sodium bisulfite or ascorbic acid may also be used.

The fact that polymers were formed by the above method was substantiated by viscosity increase, $^{13}$C and $^{31}$P NMR spectroscopy. The $^{13}$C NMR spectra showed a broad, polymer type backbone with complex CO region (62–74 ppm) and no evidence of unreacted monomers. The $^{31}$P NMR spectra were similar to that of the N-methyl, 3-(2-propenyloxy)-2-hydroxypropyl aminomethylene phosphonic acids but with broader absorbtion, an indication of polymer formation.

EXAMPLES

The invention will now be further described with reference to a number of specific examples which are to be regarded solely as illustrative, and not as restricting the scope of the invention.

Example 1 2-Propanol, 1-(methylamino)-3-(2-propenyloxy)

To a solution of 250.0 g (3.22 mole) of 40% methylamine, 100 cc deionized water and 0.2 g of 50% sodium hydroxide was slowly added 92.9 g (0.806 mole) of allyl glycidyl ether over 3 hours, maintaining the temperature below 10° C. The solution was slowly warmed to 35° C. and held for 1 hour. The reaction mixture was then fractionally distilled through a 10 inch vigreaux column to collect the product. This yielded a clear colorless liquid which was verified as the title compound by $^{13}$C NMR spectroscopy.

Example 2 N-Methyl, 3-(2-propenyloxy)-2-hydroxypropyl aminomethylene phosphonic acid (MPHPAP)

A solution of 24.6 g (0.3 mole) phosphorous acid, 29.2 g concentrated hydrochloric acid and 40 cc of water was added to 50 g (0.344 mole) of example 1. The resulting solution was then heated to reflux whereupon 28 g (0.344 mole) of a 37% aqueous formaldehyde solution was added over 240 minutes. After refluxing for an additional 30 minutes, the product was cooled and further purified to remove the inorganic phosphorus moieties that remained. The pH of the solution was adjusted to 7.1 by the addition of 39.2 g of 50% sodium hydroxide. The solution was stripped to dryness on a rotary evaporator producing a yellow syrupy product. An equal volume of methanol was added and stirred with warming for 2 hours. The product was filtered to remove the inorganic salts, stripped of methanol and redissolved in water.

The resulting product was verified by $^{13}$C-NMR (see Table I) and $^{31}$P-NMR. The $^{31}$P-NMR shows the majority (84%) of the product at 7.8 ppm downfield from the $H_3PO_4$ standard and a smaller peak (14.9%) at 12.2 ppm which is attributed to the sodium salt of the phosphoric acid. The coupled spectra splits these peaks into a triplet because of the two protons on the neighboring methylene group. Inorganic phosphorous only comprises 1.1% of the phosphorous in the sample.

TABLE I $^{13}$C NMR Data for MPHPAP (Example 2)

$$CH_2=CH-CH_2-O-CH_2-CH(OH)-CH_2-N(CH_3)-CH_2-P(=O)(OH/Na)_2$$
a  b  c         d      e       f         g    h

| Example # | Shift in ppm | | | | | | | |
|---|---|---|---|---|---|---|---|---|
| | a | b | c | d | e | f | g | h |
| 2 | 118.1 | 133.7 | 71.7 | 71.2 | 64.1 | 59.8 | 42.9 | 53.7 & 55.6 |

Example 3 Preparation of Acrylic Acid/MPHPAP Copolymer Molar Ratio of 4:1

To a solution of 30.7 g of 32.6% MPHPAP, prepared according to example 2, 30 g deionized water and 2.0 g isopropanol was simultaneously added 12.1 g (0.167 mole) acrylic acid and 9.9 g of a 24.2% sodium persulfate solution, over 240 minutes at 87° C. The reaction was held at temperature for two hours with an additional 0.4 g of the persulfate solution being added after the first hour. 7.0 g of a water/IPA azeotrope were then removed from the polymer solution. The reaction mixture was cooled to room temperature and 7.3 g of 50% caustic soda was added.

The copolymer solution, after being diluted to 25% solids had a Brookfield viscosity of 19 cps. The resulting product was a yellow clear solution. The structure of the copolymer was verified by $^{13}$C NMR. The spectrum was characterized by a broad, poly(acrylic acid)-type backbone and a complex CO region at 62–74 ppm and no evidence of unreacted monomer. Also, the pronounced C-P split at 52.5 and 54.5 ppm with a $J_{PC}$ of 135.8 Hertz is present. The $^{31}$P NMR spectrum was similar to that described in example 2 except that the level of inorganic phosphorus was about 8%.

Example 4 Preparation of Acrylic Acid/MPHPAP Copolymer Molar Ratio of 3:1

To a solution of 74.3 g (0.115 mole) of 37% MPHPAP, prepared according to example 2, 74.3 g deionized water and 2.8 g isopropanol was simultaneously added 24.9 g (0.345 mole) acrylic acid and 9.4 g of a 24.2% sodium persulfate solution, over 180 minutes at 88° C. The reaction was held at temperature for one hour followed by the removal of 13.5 g of a water/isopropanol azeotrope. The reaction mixture was cooled to room temperature and 14.7 g of 50% sodium hydroxide was added. The polymer solution after being diluted to 25% solids, had a Brookfield viscosity of 17.5 cps. The structure of the copolymer was verified by $^{13}C$ NMR. Low levels of unreacted monomer could be detected.

Example 5 Preparation of Acrylamide/MPHPAP Copolymer Molar Ratio of 4:1

A solution of 25.0 g (0.0418 mole) of 40% MPHPAP, prepared according to example 2, and 60.6 g of deionized water was adjusted to a pH=4.0 with 70% nitric acid. This solution was then heated to 70° C. Next, 0.875 g of V-50 (Wako Chem) initiator dissolved in 11.2 g of water was added all at once to the hot solution followed by the addition of 23.7 g (0.167 mole) of 50% acrylamide over 2½ hours such that one half of the acrylamide was added after 50 minutes. The reaction was held at 70° C. for one hour then raised to 80° C. for one hour before cooling to room temperature.

The copolymer solution, after being diluted to 21% solids had a Brookfield viscosity of 16.5 cps. The resulting product was a light yellow clear solution. Structure of this polymer was verified by $^{13}C$ and $^{31}P$ NMR spectroscopy.

Example 6 Preparation of Methacrylic Acid/MPHPAP Copolymer Molar Ratio of 4:1

To a solution of 25.0 g (0.0418 mole) of 40% MPHPAP prepared according to example 2 and 15.0 g deionized water was simultaneously added 29.4 g (0.167 mole) of 49% methacrylic acid adjusted to a pH=5.0 with 0.2 g of 50% sodium hydroxide, along with 6.8 g of a 15.2% sodium persulfate solution over 150 minutes at 85° C.

The reaction was held at temperature for 2 hours, adding an additional 0.5 g of sodium persulfate after 1 hour. The polymer solution, after cooling to room temperature and diluting to 25% solids, had a Brookfield viscosity of 329 cps.

DEPOSIT CONTROL ACTIVITY

The deposit control activity of the resulting polymer was tested with the results being reported in Tables II to IV.

TABLE II

Calcium O—Phosphate Inhibition
Conditions: 600 ppm Ca as $CaCO_3$,
12 ppm $PO_4$, pH 7.0, 2 mM $NaHCO_3$,
70° C., 17 hours equilibration

| Example | ppm Active | % Inhibition | | |
|---|---|---|---|---|
| | | 5 | 10 | 20 |
| 3 | | 0 | 16 | 47 |

TABLE III

Calcium Carbonate Inhibition
Conditions: 1105 ppm Ca as $CaCO_3$,
1170 ppm $CO_3$ as $CaCO_3$, pH 9.0,
70° C., 17 hour equilibration

| Example | ppm Active | % Inhibition | | |
|---|---|---|---|---|
| | | .5 | 1 | 2 |
| 3 | | 2 | 12 | 37 |

TABLE IV

Magnesium Silicate Inhibition
Conditions: 80 ppm, $Mg^{2+}$ as $CaCO_3$,
150 ppm $SiO_2$, pH 9.0,
70° C., 2mM $NaHCO_3$, 17-hour equilibration

| Example | ppm Active | % Inhibition | | |
|---|---|---|---|---|
| | | 5 | 20 | 40 |
| 3 | | 38 | 42 | 42 |

The procedures used for the above tests are detailed in U.S. Pat. Nos. 4,452,704 (Snyder et al.) and 4,759,851 (Chen).

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method of inhibiting the formation and deposition of scale imparting compounds in an aqueous system, comprising adding a sufficient amount for the purpose of a water soluble polymer having repeat units of the structure:

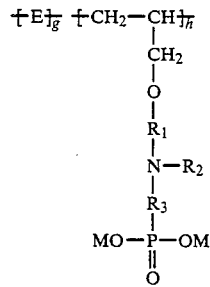

wherein E in the above formula is the repeat unit obtained after polymerization of ethylenically unsaturated compounds, $R_1$ is a hydroxyl substituted lower alkylene group having from about 1–6 carbon atoms or a nonsubstituted lower alkylene group having from about 1–6 carbon atoms; $R_2$ is hydrogen or a lower alkyl group having from about 1–5 carbon atoms; $R_3$ is a lower alkylene group having from about 1–6 carbon atoms; M is hydrogen or a water soluble cation; the molar ratio of said repeat units g:h being within the range of 30:1 to 1:20.

2. The method as recited in claim 1 wherein said ethylenically unsaturated compounds are preferably carboxylic acids selected from the group consisting of amides of said carboxylic acids, lower alkyl (C1–C6) esters of said carboxylic acids or hydroxylated lower alkyl (C1–C6) esters of said carboxylic acids.

3. The method as recited in claim 1 wherein said ethylenically unsaturated compounds are selected from the group consisting of acrylic acid, methacrylic acid, acrylamide, maleic acid or anhydride, styrene sulfonic acid, 2-acrylamido-2-methylpropylsulfonic acid, itaconic acid, 2-hydroxypropyl acrylate and water soluble salt derivatives of said acids.

4. The method as recited in claim 1 wherein the molar ratio g:h is from about 10:1 to about 1:5.

5. The method as recited in claim 1 wherein E comprises acrylic acid, $R_1$ comprises 2-hydroxypropylene, $R_2$ comprises methyl and $R_3$ comprises methylene.

6. The method as recited in claim 1 wherein E comprises acrylamide, $R_1$ comprises 2-hydroxypropylene, $R_2$ comprises methyl and $R_3$ comprises methylene.

7. The method as recited in claim 1 wherein E comprises methacrylic acid, $R_1$ comprises hydroxypropylene, $R_2$ comprises methyl and $R_3$ comprises methylene.

8. The method as recited in claim 1 wherein said polymer is a terpolymer in which E comprises repeat units of two different ethylenically unsaturated compounds and $R_1$ comprises hydroxypropylene, $R_2$ comprises methyl and $R_3$ comprises methylene.

9. The method as recited in claim 1 wherein said water soluble cation M is $Na^+$, $K^+$ or $NH_4^+$.

10. The method as recited in claim 1 wherein said aqueous system is a steam generating system.

11. The method as recited in claim 1 wherein said aqueous system is a cooling water system.

12. The method as recited in claim 1 wherein said aqueous system is a conversion coating system.

13. The method as recited in claim 1 wherein the aqueous system is a paper and pulp processing system.

14. The method as recited in claim 1 wherein the aqueous system is a gas scrubbing system.

* * * * *